US009424616B2

(12) United States Patent
Verley

(10) Patent No.: US 9,424,616 B2
(45) Date of Patent: *Aug. 23, 2016

(54) CUSTOMER IDENTITY VERIFICATION

(71) Applicant: GOOGLE INC., Mountain View, CA (US)

(72) Inventor: Filip Verley, Redwood City, CA (US)

(73) Assignee: GOOGLE INC., Mountain View, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/794,602

(22) Filed: Mar. 11, 2013

(65) Prior Publication Data

US 2016/0148331 A1 May 26, 2016

(51) Int. Cl.

| | |
|---|---|
| ***G06Q 10/10*** | (2012.01) |
| ***G06Q 30/02*** | (2012.01) |
| ***G06Q 40/08*** | (2012.01) |
| ***G06Q 10/08*** | (2012.01) |
| ***G06Q 50/26*** | (2012.01) |
| ***G06Q 30/00*** | (2012.01) |

(52) U.S. Cl.
CPC .............. *G06Q 50/265* (2013.01); *G06Q 30/01* (2013.01)

(58) Field of Classification Search
CPC .................................................... G06Q 50/265
USPC .......................................... 705/325, 1.1–912
See application file for complete search history.

(56) References Cited

U.S. PATENT DOCUMENTS

| | | | |
|---|---|---|---|
| 7,395,243 | B1 | 7/2008 | Zielke et al. |
| 7,792,748 | B1 | 9/2010 | Ebersole et al. |
| 8,256,013 | B1 | 8/2012 | Hernacki et al. |
| 8,732,089 | B1 | 5/2014 | Fang et al. |
| 2004/0122685 | A1 | 6/2004 | Bunce |
| 2004/0139009 | A1 | 7/2004 | Kozee et al. |
| 2004/0139050 | A1 | 7/2004 | Barrett et al. |
| 2005/0086068 | A1 | 4/2005 | Quigley |
| 2005/0256803 | A1 | 11/2005 | Ramos et al. |

(Continued)

FOREIGN PATENT DOCUMENTS

| | | | |
|---|---|---|---|
| JP | 2006260504 | A | 9/2006 |
| KR | 1020050063176 | A | 6/2005 |

OTHER PUBLICATIONS

Lim, "Google 2 Step Authentication Review," The Gadgeteer, Jan. 2, 2012.*
Demery, "Airlines steer through online payment turbulence," B2B Ecommerce, May 18, 2011.*
Oh, "International Search Report and Written Opinion issued in International Application No. PCT/US2013/070259", Feb. 27, 2014, 1-11.

(Continued)

*Primary Examiner* — Jonathan Ouellette
(74) *Attorney, Agent, or Firm* — Johnson, Marcou & Isaacs, LLC

(57) ABSTRACT

Customer identity verification. Receiving a request for verification of a customer's identity. The request includes fields of customer identity data. Requesting, from a first verification resource, verification of the customer's identity using the customer identity data. Receiving from the first verification resource, first verification results including at least one new field of customer identity data. The first verification results being insufficient to verify the customer's identity. Requesting, from a second verification resource, verification of the customer's identity using the at least one new field of customer identity data. Receiving, from the second verification resource, second verification results. For second verification results sufficient to verify the customer's identity, communicating to the customer a successful verification of the customer's identity.

20 Claims, 7 Drawing Sheets

100

(56) References Cited

U.S. PATENT DOCUMENTS

| | | | |
|---|---|---|---|
| 2005/0278222 | A1 | 12/2005 | Nortrup |
| 2006/0101508 | A1 | 5/2006 | Taylor et al. |
| 2006/0212713 | A1 | 9/2006 | Hatakeda |
| 2007/0210945 | A1 | 9/2007 | Chu et al. |
| 2009/0287601 | A1 | 11/2009 | Tumminaro et al. |
| 2010/0050233 | A1 * | 2/2010 | Ross ................................. 726/2 |
| 2010/0123003 | A1 | 5/2010 | Olson et al. |
| 2012/0066758 | A1 | 3/2012 | Kasturi |

OTHER PUBLICATIONS

Warden, "Office Action issued in co-pending U.S. Appl. No. 14/081,061, filed Nov. 15, 2013", Nov. 19, 2014, 1-31.

U.S. Appl. No. 14/081,061 to Andrews et al. filed Nov. 15, 2013.

Warden, "Office Action issued in co-pending U.S. Appl. No. 14/081,061, filed Nov. 15, 2013", Jun. 16, 2015, 1-39.

* cited by examiner

300

CUSTOMER IDENTITY VERIFICATION

TECHNICAL FIELD

The technology disclosed herein pertains to identity verification. More particularly, embodiments of the technology pertain to identity verification in the context of "Know Your Customer" (KYC) activities.

BACKGROUND

Know Your Customer (KYC) typically refers to the activities of customer-related due diligence that financial institutions and other regulated companies (including e-payment companies) perform to identify their clients and ascertain relevant information pertinent to doing financial business (including supporting online payments) with them, and to the regulations that govern those activities. In the USA, KYC typically is a policy and process implemented to conform to a customer identification program (CIP) mandated under the Bank Secrecy Act and USA PATRIOT Act. While KYC is described herein in a statutory and regulatory framework to illustrate aspects of the present technology, embodiments of the technology can be applied outside the statutory and regulatory framework. More generally, embodiments of the disclosed technology can find application to identity verification in other than the KYC context.

A KYC program typically may include: collection of identity information such as first name, last name, address, social security number (SSN) (or other applicable identification number), and phone number; verification of the collected KYC data; risk determination (e.g., of the risk of money laundering or identity theft associated with the customer); creation of an expectation of a customer's transactional behavior; and monitoring of a customer's transactions against their expected behavior and recorded profile as well as that of the customer's peers.

SUMMARY

The technology includes computer-implemented methods, computer program products, and systems for customer identity verification. In some embodiments, the technology can receive a request for verification of a customer's identity. The request can include fields of customer identity data. Verification of the customer's identity using the customer identity data can be requested from a first verification resource. First verification results, insufficient to verify the customer's identity, can be received from the first verification resource. The first verification results can contain at least one new field of customer identity data. Verification of the customer's identity using a new field of customer identity data can be requested from a second verification resource. Second verification results, corresponding to the second request can be received from the second verification resource. For second verification results sufficient to verify the customer's identity, a successful verification can be communicated to the customer. In some embodiments, a domain of the second verification resource corresponds to a domain of the new field.

In some embodiments, the second verification results include a second new field of customer identity data, and yet the cumulative verification results remain insufficient to verify the customer's identity. In such embodiments verification of the customer's identity can be requested from a subsequent verification resource. Such embodiments can receive subsequent verification results from the subsequent verification resource. For subsequent verification results sufficient to verify the customer's identity, such embodiments can communicate a successful verification of the customer's identity to the customer.

In some embodiments, prior to requesting verification from a verification resource, it is determined if cumulative received verification results support continued processing. In such embodiments, requesting verification of a customer's identity occurs only on a determination that cumulative verification results support continued processing.

In some embodiments, derived customer identity data can be determined from at least one of customer identity data and received verification results. The derived customer identity data can be used in a query to a verification resource requesting verification of customer identity.

In some embodiments, after receiving verification results comprising at least one new field of customer identity data, the technology can perform out-of-wallet verification using the verification results comprising at least one new field of customer identity data.

DETAILED DESCRIPTION

Under rules in a typical jurisdiction, an entity subject to KYC requirements need not verify every element of identifying information collected, but must do so for enough information to form a reasonable belief it knows the true identity of the customer. A typical approach to verification involves submitting KYC data collected from the customer to third party verification resources. A verification resource can be a service offered by an organization such as a credit bureau, however, any service that can verify KYC data can be a verification resource. Other examples of verification resources can be found throughout this disclosure.

The verification resource typically returns a score, and in some cases, may return detailed information regarding fields of information that have been verified and fields of information that are held by the resource—collectively referred to herein as verification results. The organization conducting KYC may use the verification results returned from verification resources as input to processes for determining if a reasonable belief can be formed that the collected identity information represents the true identity of the customer.

With regard to customer identity that can either be readily verified or readily determined to be false, the KYC process may be readily automated. But with regard to some cases, verification results (even results obtained from a plurality of vendors) can be inconclusive. Processing these inconclusive cases can be resource-intensive, and has typically been approached as a manual activity. Simply accepting such customers can present both regulatory and business risk to the organization conducting KYC. Rejecting the customer in those cases may reduce KYC process costs, but also may prevent legitimate customers from being acquired. Rejecting legitimate customers because verification resources contain insufficient information to reflect the customer's true identity clearly is not an efficient approach to conducting business.

Overview

Embodiments of the technology include computer-implemented methods, computer program products, and systems for conducting a KYC process by using the verification results provided by one or more verification resources to query additional verification resources. Such leveraging can facilitate verification of initially inconclusive cases that should be allowed.

Example System Architectures

Figure 1:
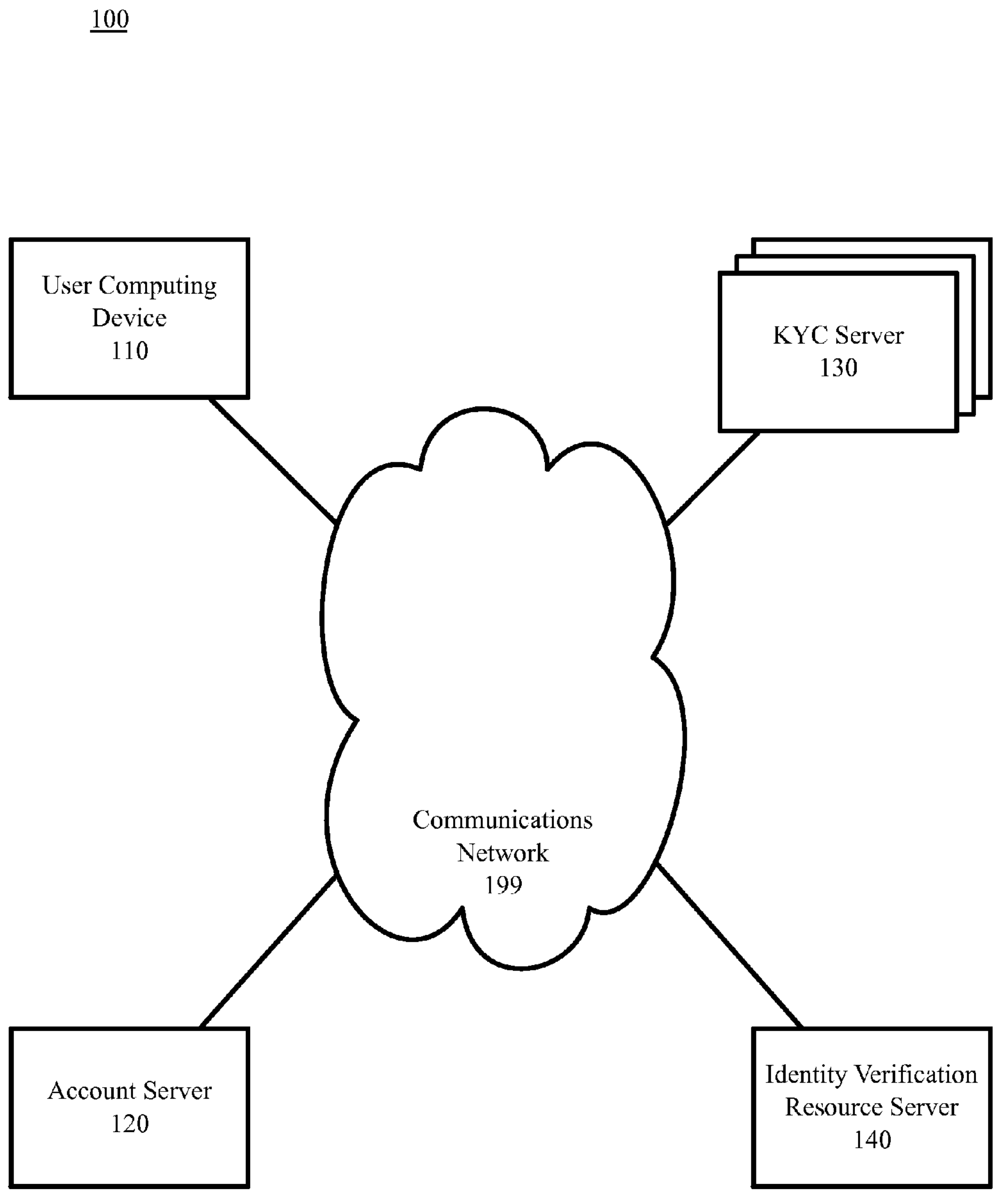
FIG. 1 is a diagram of an architecture for example embodiments of the technology disclosed herein.

Turning now to the drawings, in which like numerals represent like (but not necessarily identical) elements throughout the figures, example embodiments are described in detail. FIG. 1 is a diagram of an architecture 100 for example embodiments of the technology disclosed herein. As depicted in FIG. 1, the architecture 100 includes network devices 110, 120, 130, and 140; each of which may be configured to communicate with one another via communications network 199.

Network 199 includes one or more wired or wireless telecommunications means by which network devices may exchange data. For example, the network 199 may include one or more of a local area network ("LAN"), a wide area network ("WAN"), an intranet, an Internet, a storage area network (SAN), a personal area network (PAN), a metropolitan area network (MAN), a wireless local area network (WLAN), a virtual private network (VPN), a cellular or other mobile communication network, a Bluetooth connection, a near field communication (NFC) connection, barcode, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 199. For example, each network device can include a server, a desktop computer, a laptop computer, a tablet computer, a television with one or more processors embedded therein and/or coupled thereto, a smart phone, a handheld computer, a personal digital assistant ("PDA"), or any other wired or wireless processor-driven device. In the example embodiment depicted in FIG. 1, the network devices 110, 120, 130, and 140 may be operated by a user, a company offering account subject to KYC, a company performing KYC, and an identity verification resource, respectively. A user may use an application, such as a web browser application or a native application, executing on user device 110 to view, download, upload, or otherwise access functionality and information via the network 199, e.g., from an account server 120. The application may interact with web servers or other computing devices connected to the network 199, including KYC server 130.

The network connections shown are example and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example a user device 110 embodied as a mobile phone or handheld computer may not include all the components described above.

In such an architecture, when a user, via a user device 110, interacts with an account server 120 in a way that subjects the user's account (or prospective account) to KYC requirements (for example, establishing an e-payment account), the account server 120 can request that KYC be performed for the account by the KYC server 130. The KYC server 130 can directly, or indirectly through the account server 120, interact with the user via the user device 110 to collect identifying information. Upon obtaining identifying information, the KYC server 130 can interact with one or more verification resources 140 to verify the obtained identifying information. The KYC server can then complete the KYC process, e.g., risk assessment, user categorizing, and account monitoring.

Example Processes

Figure 2:
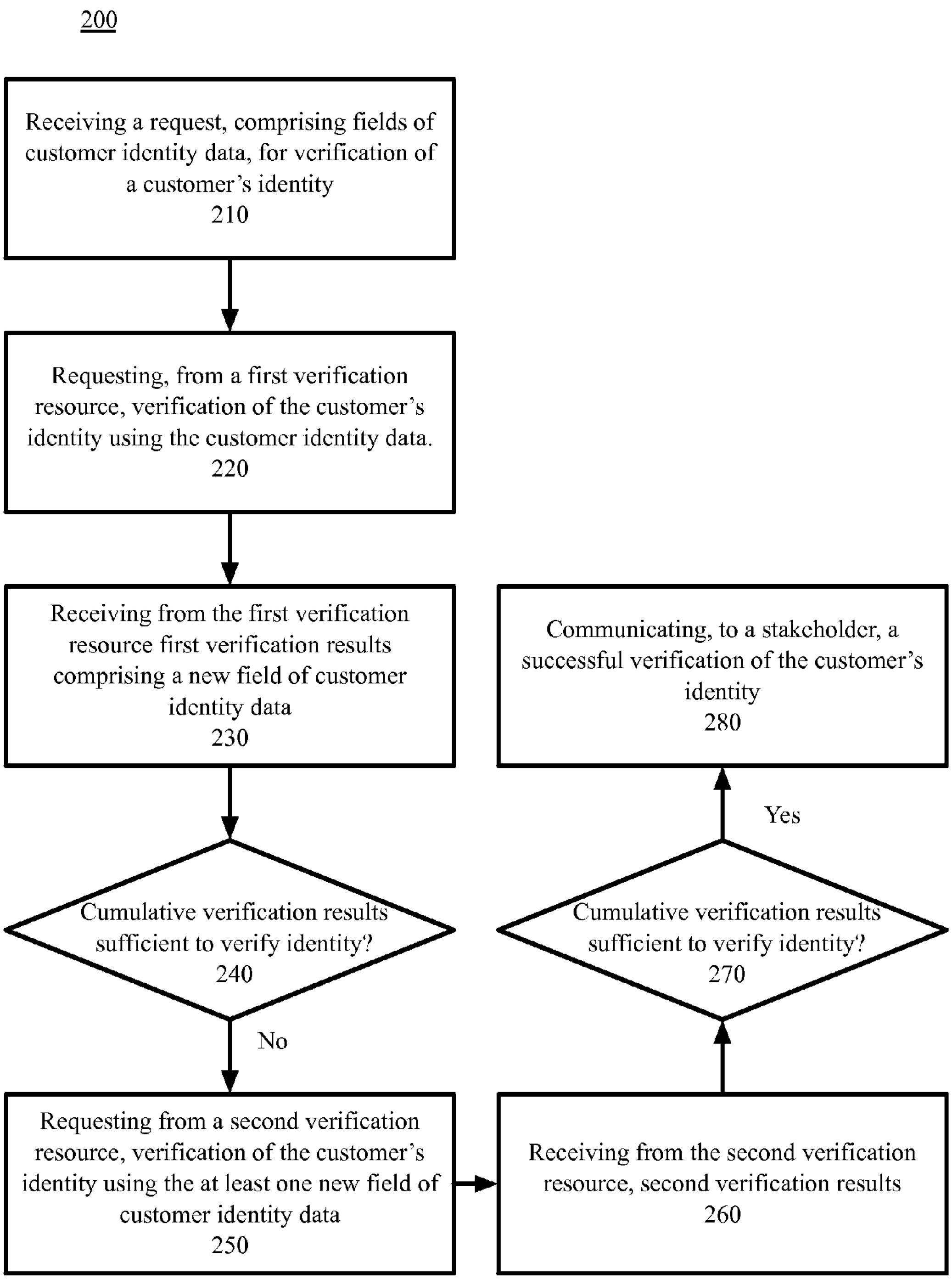
FIG. 2 is a diagram depicting methods for verifying the identity of a customer, in accordance with certain example embodiments.

While the example methods illustrated in FIG. 2 through FIG. 6 are described with respect to the components of the example operating environment 100, the technology may also be implemented with other systems in other environments. Referring to FIG. 2, methods 200 for verifying the identity of a customer are illustrated. In some such methods, a request for verification of a customer's identity can be received—Block 210. The request for customer identity verification can include customer identity data fields. For example, the request can come from an account server 120, such as an account server for a bank, to a KYC server 130, such as a KYC server operated by the bank or by a third party. The technology can receive first name, last name, school address, school phone number, social security number (SSN), date of birth (DOB), and occupation from a customer who is a student living on campus at a college. In this case, the customer identifies her occupation as "student." The student also maintains a residence with her parents.

The technology can request verification of the student's identity as part of a KYC process by querying a verification resource using the customer identity data fields—Block 220. Verification resources can include credit reporting bureaus, social networks, federal election campaign contribution records, genealogy resources, etc.

The technology can receive first verification results, which can include a new field of customer identity data, from the queried verification resource—Block 230. For example, the technology can receive a second address and a second phone number (not provided to the technology by the student) as part of results that confirm that the received SSN and DOB correspond to the student's received first name and last name.

Embodiments of the technology can determine if the cumulative verification results are sufficient to verify the customer's identity—Block 240. For example, in a verification approach using a 0-100 scoring system a score of 50 and above can be sufficient to verify a customer's identity. Relating SSN and DOB to the student's first name and last name may not be sufficient to score 50 or above in such a scoring system.

Consider that verification resources typically charge a fee for verifying customer identity. The cost of continuing to request verification of a customer's identity can outweigh the benefit of retaining the customer—especially where the identity can be confirmed to be false. In some embodiments of the present technology, while a score above a first threshold can be used to conclude that the customer's identity has been verified, a score below a second threshold, at least marginally lower than the first threshold, can be used to support rejection, leaving a score between the thresholds to support further processing as described herein.

Continuing with the example of the preceding paragraph, while a score of 50 and above can be sufficient to conclude that the customer's identity is verified, a score of 10 or below can support the rejection of the customer. In the case of the student, a score between these thresholds can be used to justify continued processing.

Embodiments of the present technology can verify customer identity by building on information gained from one or more previously queried verification resources. The technology can request verification of a customer's identity from a second verification resource using the new information obtained from the first verification resource—Block 250. For example, the second address and second phone number received as part of the first verification results for the student (along with confirmed first name, last name, SSN and DOB) can be used to query a second verification resource.

In some embodiments, the second verification resource can be chosen as a resource having the new customer identity information as a domain. For example, address and phone number can be considered to be in the domain of a verification resource specializing in telephone numbers. This approach can be used not only with querying a second verification resource with new information obtained from a first verification resource, but also can be used with respect to subsequently queried verification resources.

The technology can receive second verification results—Block 260. For example, the technology can receive a confirmation of the second address and second phone number associated with a person having the same last name as the student.

Embodiments of the technology can determine if the cumulative verification results are sufficient to verify the customer's identity—Block 270. In the case of the student, the technology can confirm the second address and second phone number as corresponding to the last name. Given that the initially received customer identity data fields included "student" as an occupation, the technology can score the student's identity as over 50 based on a heuristic that confirms a second address for students if the last name matches.

In such a case, the successful verification can be communicated to one or more stakeholders in the process, such as the entity offering the account, or the customer (in this case, the student), or both—Block 280. If the customer provided customer identity fields as a condition for access to a financial account, then the remainder of the KYC process can be completed, and if completed successfully, the customer can be permitted access to functionality of the account.

Figure 3A:
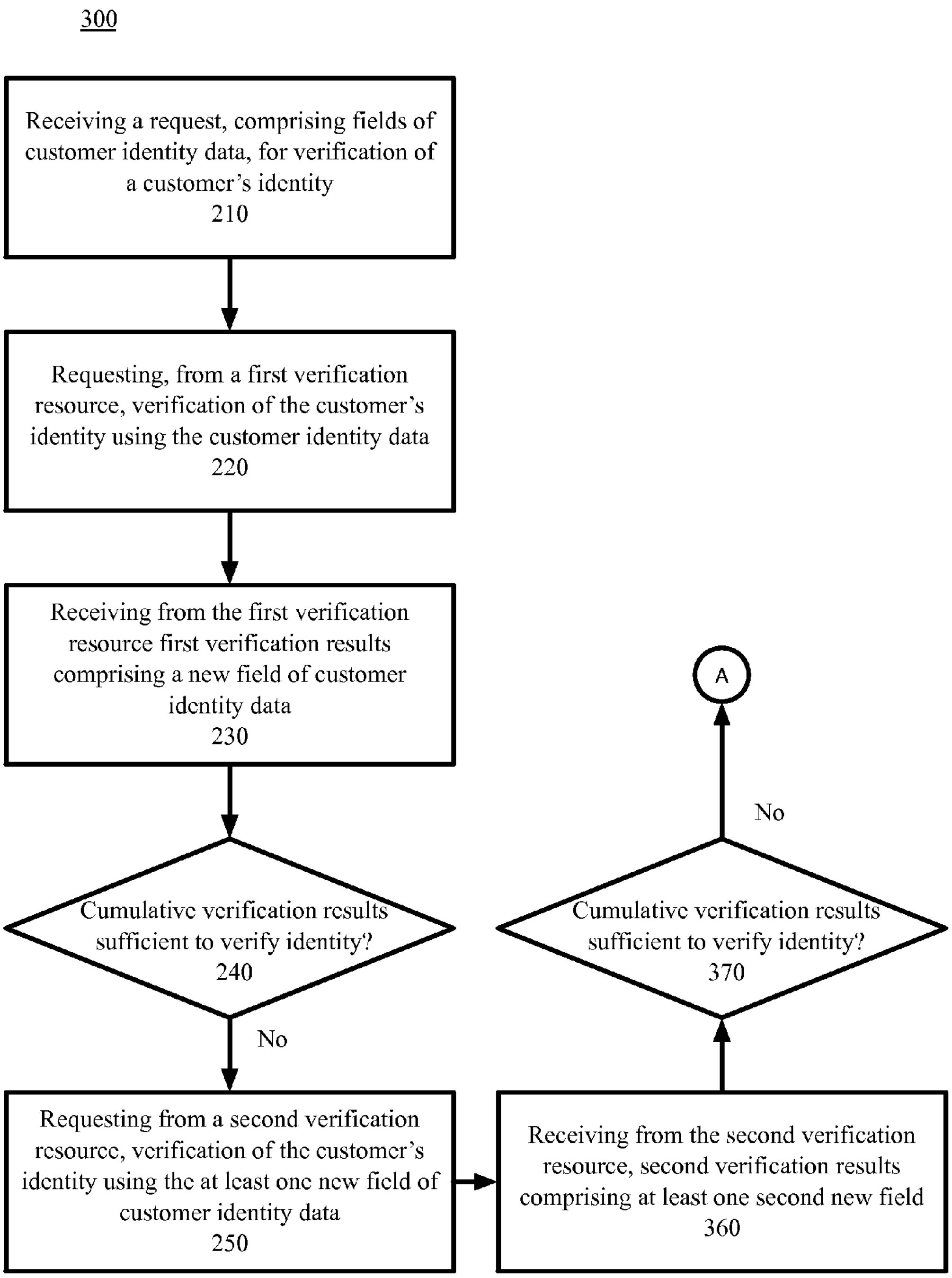
FIG. 3A and FIG. 3B is a diagram depicting methods for verifying the identity of a customer, in accordance with certain example embodiments.
Figure 3B:
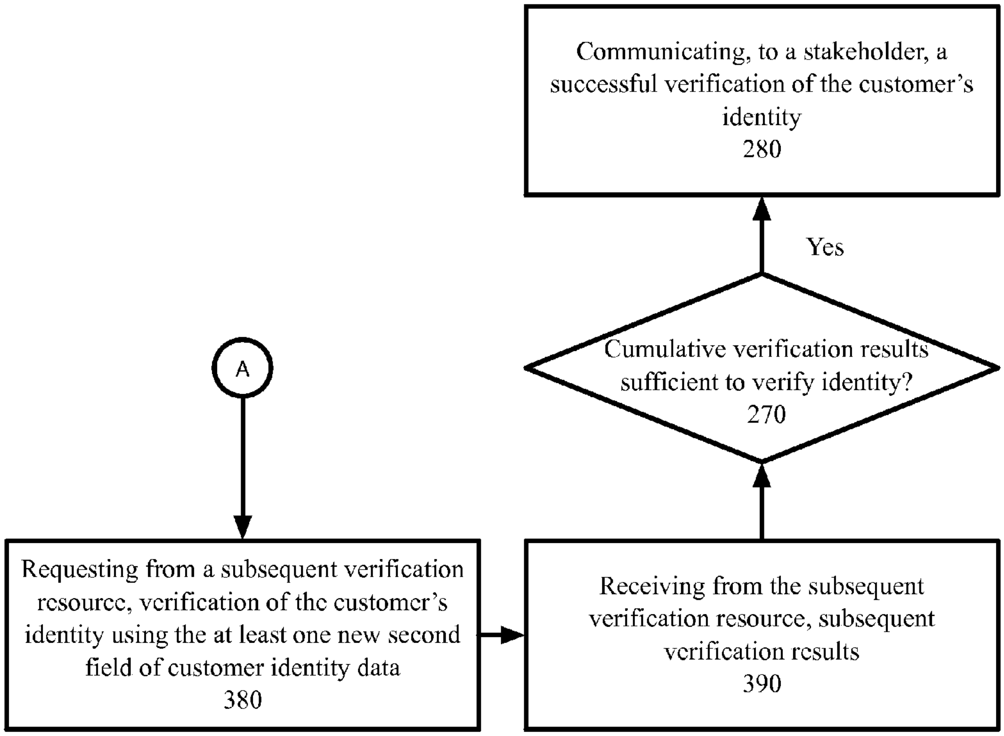

Referring to FIG. 3A and FIG. 3B, and continuing to refer to FIG. 2 for context, further methods 300 for verifying the identity of a customer are illustrated. In some such methods, Blocks 210, 220, 230, 240, and 250 can be performed as described above, but in such methods, at least one second new field is returned in response to querying the second verification resource—Block 360. For example, three mobile phone numbers are returned as associated with the second address now associated with the student.

Similar to Block 240, embodiments of the technology can determine if the cumulative verification results are sufficient to verify the customer's identity—Block 370. Unlike in the embodiment shown in FIG. 2, it is determined that cumulative verification results are not sufficient to verify the customer's identity.

Embodiments of the present technology can continue to build on information gained from previously queried verification resources. Such embodiments can request verification of a customer's identity from a subsequent verification resource using a second new field obtained from the second verification resource—Block 380. For example, each of the mobile phone numbers received in Block 360 can be used to query a subsequent verification resource.

The technology can then receive subsequent verification results from the subsequent verification resource—Block 390. Continuing with the student example, the subsequent verification results can correlate one of the mobile phone numbers with the student's first name, last name, and DOB.

Embodiments of the technology can determine if the cumulative verification results are sufficient to verify the customer's identity—Block 270. In the case of the student, the correlation of the student's first name, last name, and DOB with one of the mobile phone numbers can complete the verification process. The technology can then communicate successful verification to the customer—Block 280.

Figure 4:
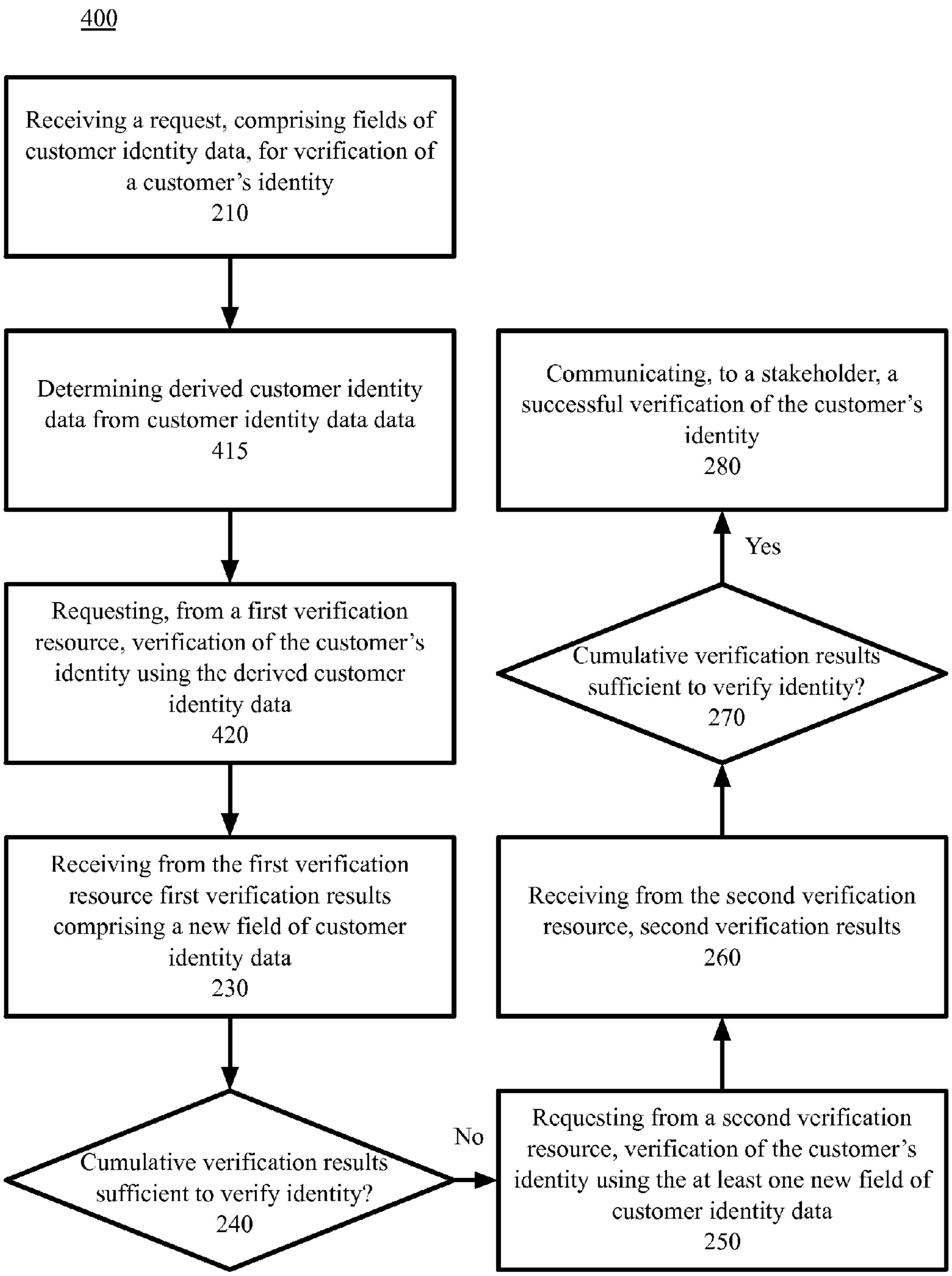
FIG. 4 is a diagram depicting methods for verifying the identity of a customer, in accordance with certain example embodiments.

Referring to FIG. 4, and continuing to refer to FIG. 2 for context, further methods 400 for verifying the identity of a customer are illustrated. In some such methods, a request for verification of a customer's identity is received as in Block 210. In the embodiments illustrated in FIG. 4, the technology can determine derived customer identity data from customer data—Block 415. For example, the student's age can be determined from the received DOB. The derived data can be used to query a first verification resource—Block 420. As another example, a high school graduation year over twenty years in the past indicated by a customer as part of KYC customer data can be used to determine derived data that the customer is over age 20+N years old; where N is a predetermined number, e.g., 12. The query can created with a Boolean restriction that incorporates the derived data, e.g., "AND age>32." While illustrated as prior to obtaining first KYC results 230, method 400 can be applied prior to at any stage of KYC. The method can proceed as described above with respect to Blocks 240, 250, 260, 270, and 280.

Figure 5:
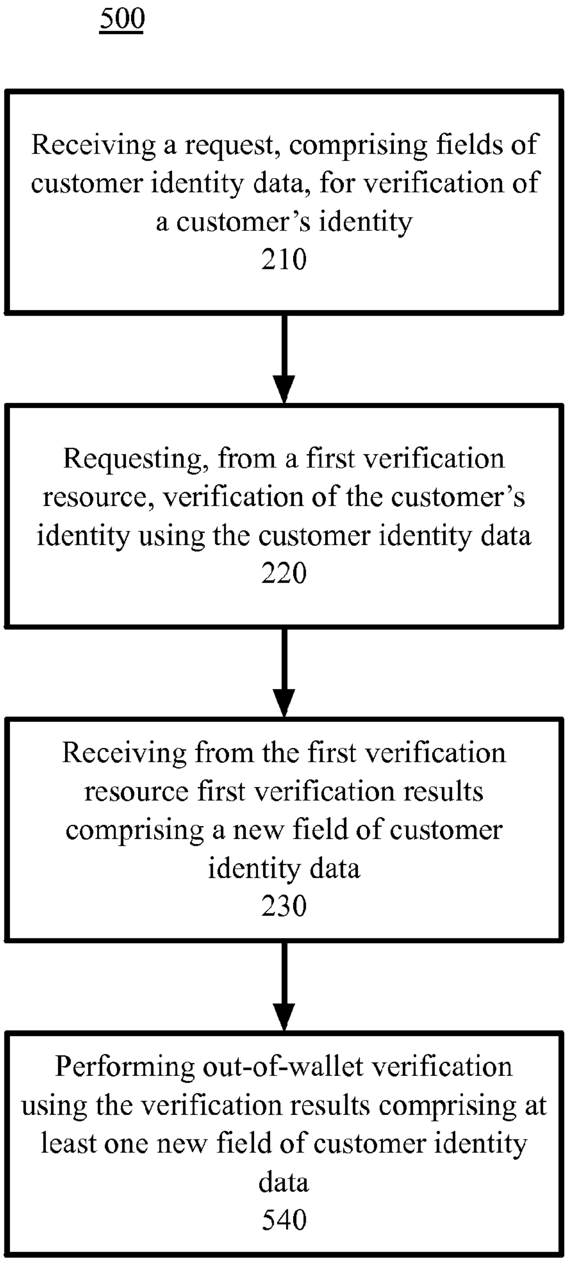
FIG. 5 is a diagram depicting methods for verifying the identity of a customer, in accordance with certain example embodiments.

Referring to FIG. 5, and continuing to refer to FIG. 2 for context, further methods 500 for verifying the identity of a customer are illustrated. In such methods, blocks 210, 220, and 230 are performed as described in connection with FIG. 2, resulting in at least one new field of customer data. The new field of customer identity data can be used to conduct "out of wallet" (OOW) identity verification—Block 540. "OOW" refers to a verification process using certain less publicly-available data, such as the model of a vehicle formerly owned by the consumer, for verification in activities such as telephone banking or internet banking in order to prevent identity theft. While a particular consumer would know this information, most consumers are not likely to carry such information in a wallet. Typical OOW topics include: the color of your first car; the name the first school you attended, the name of the hospital you were born in. Correct answers to such questions can contribute to a successful verification. While illustrated as subsequent to receiving subsequent KYC verification, performing OOW using KYC verification results other than KYC data provided by the consumer, can be implemented at any point when customer identity data (other than data provided by the consumer) has been obtained.

Other Example Embodiments

Figure 6:
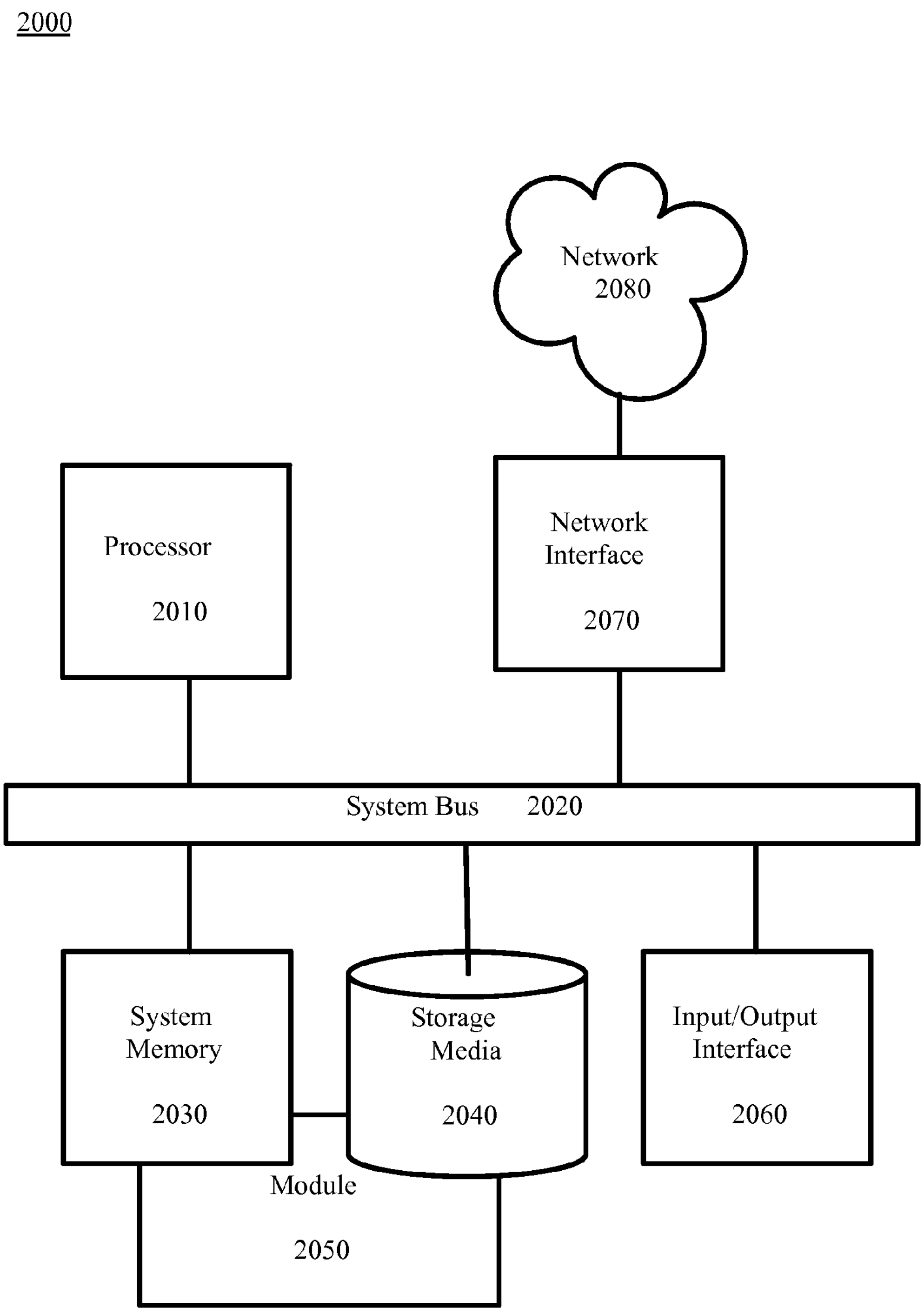
FIG. 6 is a block diagram depicting a computing machine and a module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the technology discussed here collects personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

I claim:

1. A computer-implemented method for customer identity verification, comprising:

receiving, using one or more computing devices, a request for identity verification of a customer's identity, the request comprising a plurality of fields of customer identity data;

requesting, using the one or more computing devices, from a first identity verification resource, verification of the customer's identity using the customer identity data;

receiving, using the one or more computing devices, from the first identity verification resource, first identity verification results comprising at least one new field of customer identity data;

determining, using the one or more computing devices and based on a predetermined threshold, that the first identity verification results are insufficient to verify the customer's identity;

requesting, using the one or more computing devices, from a second identity verification resource, verification of the customer's identity using the at least one new field of customer identity data;

receiving, using the one or more computing devices, from the second identity verification resource, second identity verification results;

determining, using the one or more computing devices and based on the predetermined threshold, that the second identity verification results are sufficient to verify the customer's identity; and communicating to a customer identity verification stakeholder, using the one or more computing devices, a successful verification of the customer's identity.

2. The method of claim 1 wherein a domain of the second identity verification resource corresponds to a domain of the new field.

3. The method of claim 1 further comprising, for second identity verification results comprising at least one second new field of customer identity data, the second identity verification results being insufficient to verify the customer's identity:

requesting, using the one or more computing devices, from a subsequent identity verification resource, verification of the customer's identity using the at least one second new field of customer identity data;

receiving, using the one or more computing devices, from the subsequent identity verification resource, subsequent verification results; and for subsequent identity verification results sufficient to verify the customer's identity, communicating, to the customer, a successful verification of the customer's identity.

4. The method of claim 1:

further comprising, prior to requesting, determining, using one or more computing devices, if cumulative received identity verification results support continued processing; and wherein requesting occurs only on a determination that cumulative identity verification results support continued processing.

5. The method of claim 1:

further comprising, prior to requesting verification of a customer's identity from an identity verification resource, determining, using one or more computing devices, derived customer identity data from at least one of customer identity data and received identity verification results;

wherein the request comprises derived customer identity data.

6. The method of claim 1, further comprising, after receiving identity verification results comprising at least one new field of customer identity data:

performing, using one or more computing devices, out-of-wallet identity verification using the identity verification results comprising at least one new field of customer identity data.

7. The method of claim 5 wherein determining derived customer identity data from at least one of customer identity data and received identity verification results comprises estimating age from high school graduation date.

8. A computer program product, comprising:

a non-transitory computer-readable storage device having computer-executable program instructions embodied thereon that when executed by a computer perform a method for customer identity verification, the method comprising:

receiving, using one or more computing devices, a request for verification of a customer's identity, the request comprising a plurality of fields of customer identity data;

requesting, using the one or more computing devices, from a first identity verification resource, verification of the customer's identity using the customer identity data;

receiving, using the one or more computing devices, from the first identity verification resource, first identity verification results comprising at least one new field of customer identity data;

determining, based on a predetermined threshold, that the first identity verification results are insufficient to verify the customer's identity;

requesting, using the one or more computing devices, from a second identity verification resource, verification of the customer's identity using the at least one new field of customer identity data;

receiving, using the one or more computing devices, from the second identity verification resource, second identity verification results;

determining, based on the predetermined threshold, that the second identity verification results are sufficient to verify the customer's identity; and communicating to a customer identity verification stakeholder, using the one or more computing devices, a successful verification of the customer's identity.

9. The computer program product of claim 8 wherein a domain of the second identity verification resource corresponds to a domain of the new field.

10. The computer program product of claim 8, wherein the method further comprises, for second identity verification results comprising at least one second new field of customer identity data, the second identity verification results being insufficient to verify the customer's identity:

requesting, using the one or more computing devices, from a subsequent identity verification resource, verification of the customer's identity using the at least one second new field of customer identity data;

receiving, using the one or more computing devices, from the subsequent identity verification resource, subsequent identity verification results; and for subsequent identity verification results sufficient to verify the customer's identity, communicating, to the customer, a successful verification of the customer's identity.

11. The computer program product of claim 8:

the method further comprising, prior to requesting, determining if cumulative received identity verification results support continued processing; and wherein requesting occurs only on a determination that cumulative identity verification results support continued processing.

12. The computer program product of claim 8:

the method further comprising, prior to requesting verification of a customer's identity from a verification resource determining derived customer identity data from at least one of customer identity data and received verification results;

wherein the request comprises derived customer identity data.

13. The computer program product of claim 8, the method further comprising, after receiving identity verification results comprising at least one new field of customer identity data, performing, using one or more computing devices, out-of-wallet verification using the identity verification results comprising at least one new field of customer identity data.

14. The computer program product of claim 12 wherein determining derived customer identity data from at least one of customer identity data and received identity verification results comprises estimating age from high school graduation date.

15. A system for customer identity verification, comprising:

a storage resource;

a network module; and a processor communicatively coupled to the storage resource and the network module, wherein the processor executes computer-readable instructions that are stored in the storage resource to cause the system to perform a method for customer identity verification, the method comprising:

receiving a request for verification of a customer's identity, the request comprising a plurality of fields of customer identity data;

requesting from a first identity verification resource, verification of the customer's identity using the customer identity data;

receiving from the first identity verification resource, first identity verification results comprising at least one new field of customer identity data;

determining, based on a predetermined threshold, that the first identity verification results are insufficient to verify the customer's identity;

requesting from a second identity verification resource, verification of the customer's identity using the at least one new field of customer identity data;

receiving from the second identity verification resource, second identity verification results;

determining, based on the predetermined threshold, that the second identity verification results are sufficient to verify the customer's identity; and communicating to a customer identify verification stakeholder a successful verification of the customer's identity.

16. The system of claim 15 wherein a domain of the second identity verification resource corresponds to a domain of the new field.

17. The system of claim 15, wherein the method further comprises, for second identity verification results comprising at least one second new field of customer identity data, the second identity verification results being insufficient to verify the customer's identity:

requesting, using the one or more computing devices, from a subsequent identity verification resource, verification of the customer's identity using the at least one second new field of customer identity data;

receiving, using the one or more computing devices, from the subsequent identity verification resource, subsequent identity verification results; and for subsequent identity verification results sufficient to verify the customer's identity, communicating, to the customer, a successful verification of the customer's identity.

18. The system of claim 15:

the method further comprising, prior to requesting, determining if cumulative received identity verification results support continued processing; and wherein requesting occurs only on a determination that cumulative identity verification results support continued processing.

19. The system of claim 15:

the method further comprising, prior to requesting verification of a customer's identity from a identity verification resource determining derived customer identity data from at least one of customer identity data and received identity verification results;

wherein the request comprises derived customer identity data.

20. The system of claim 15, the method further comprising, after receiving identity verification results comprising at least one new field of customer identity data, performing out-of-wallet verification using the identity verification results comprising at least one new field of customer identity data.

* * * * *